United States Patent [19]

Philpot

[11] 4,073,347
[45] Feb. 14, 1978

[54] SPRING-LOADED CLAMP FOR AN EARTH-WORKING TOOL SHANK

[75] Inventor: Marvin J. Philpot, New Berlin, Wis.

[73] Assignee: Allis-Chalmers Corporation, Milwaukee, Wis.

[21] Appl. No.: 747,693

[22] Filed: Dec. 6, 1976

[51] Int. Cl.² .............................................. A01B 19/02
[52] U.S. Cl. .................................................... 172/710
[58] Field of Search .............. 172/710, 702, 705, 264, 172/265, 266, 267, 268, 707, 708, 711

[56] References Cited

U.S. PATENT DOCUMENTS

| | | | |
|---|---|---|---|
| 2,712,780 | 7/1955 | Graham | 172/708 X |
| 2,771,018 | 11/1956 | Zahn | 172/710 |
| 2,857,833 | 10/1958 | Rolf | 172/710 |

FOREIGN PATENT DOCUMENTS

| | | | |
|---|---|---|---|
| 1,119,566 | 7/1968 | United Kingdom | 172/710 |

*Primary Examiner*—Richard J. Johnson
*Attorney, Agent, or Firm*—Charles L. Schwab

[57] ABSTRACT

The upper end of a shank of an earth-working tool is secured to a frame or tool bar by a spring-loaded clamping arrangement which includes replaceable pin and bushing components in the pivot connection between the shank and a clamping member secured to the tool bar. Spring loading is provided by a compression coil spring through which a connecting tension rod extends. A relatively hard plastic sleeve is pressed onto the tension rod and serves to keep the coils of the spring in alignment during earth-working operations. The bushing component of the pivot connection is axially split with circumferentially spaced surfaces separated sufficiently from one another to permit locking tabs to be disposed therebetween. The bushing fits in aligned bores in a rockable member secured to the upper end of the shank and the tabs extend from the rockable member into the area between the circumferentially spaced surfaces of the split bushing. The pin extends through the bushing and is nonrotatably connected to the clamping member secured to the tool bar.

19 Claims, 6 Drawing Figures

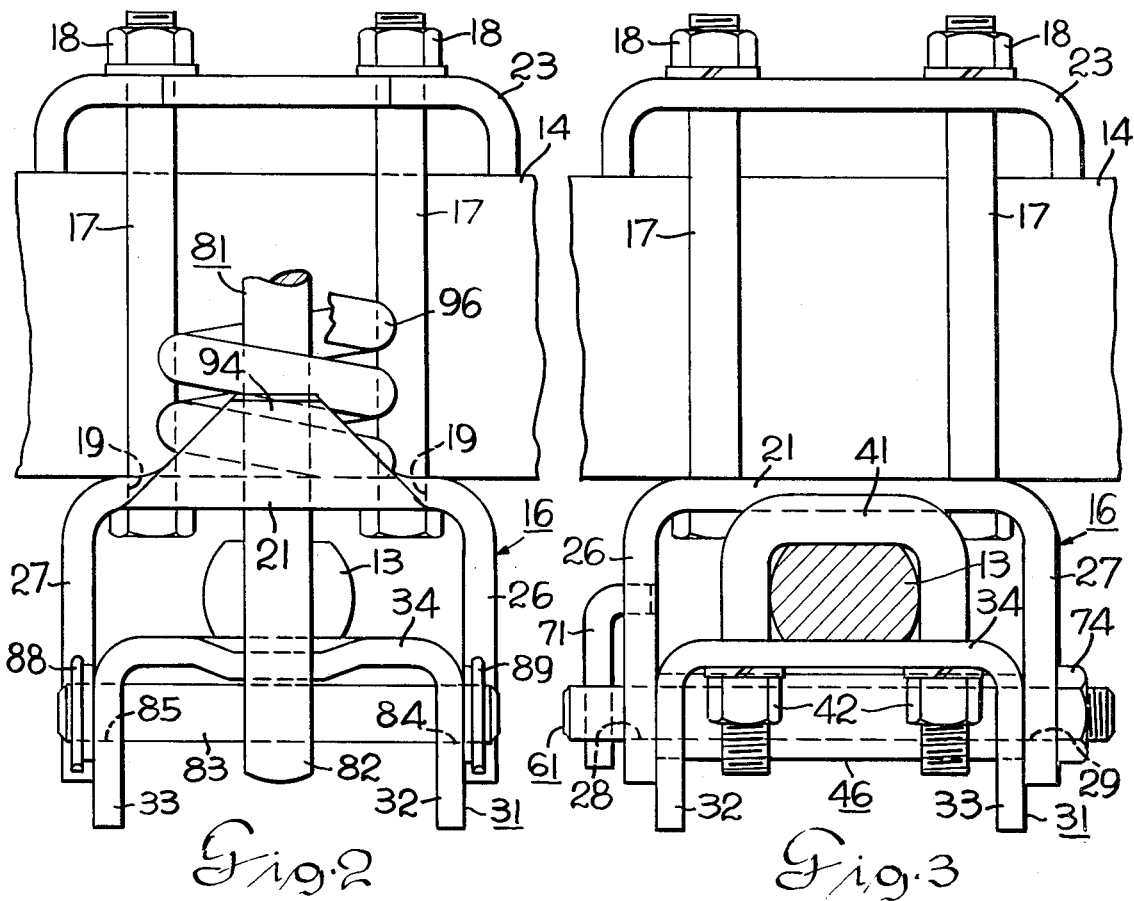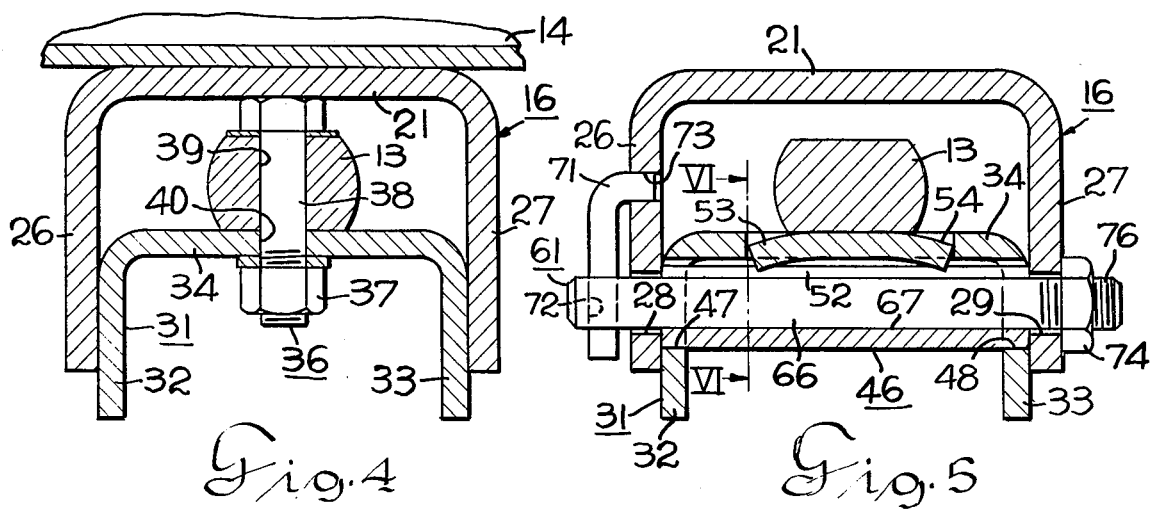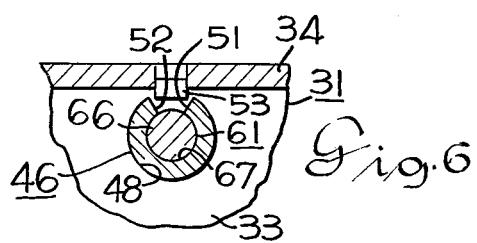

SPRING-LOADED CLAMP FOR AN EARTH-WORKING TOOL SHANK

BACKGROUND OF THE INVENTION

Heretofore others have provided spring-loaded clamps for tool shanks wherein the upper end of the tool shank is pivotally connected to the tool bar on a transverse pivot axis and a compression spring is disposed and between the tool bar and the forward end of the shank. Spring-loaded tool clamps of this type are shown in U.S. Pat. Nos. 2,776,614; 3,031,019; 2,739,518; 3,744,572; 2,857,833; 3,314,487; 3,173,494; 2,935,148; and 2,771,018. These prior art devices have not been entirely satisfactory, particularly as to providing long-wearing and/or replaceable pivot parts.

BRIEF DESCRIPTION OF THE INVENTION

This invention relates to a spring cushion clamp for the shank of an earth-working tool which includes a pivot bracket or clamping member rigidly secured to a supporting frame and a spring-loaded rockable member carrying the tool shank. The rockable member is pivotally connected to the clamping member by a pivot connection which includes a replaceable pin secured to the clamping member and a replaceable split bushing. The opposite ends of the bushing are received in transversely aligned openings in the rockable member with the split side of the bushing in abutting relation to abutment means on the rockable member whereby rotational movement of the bushing relative to the rockable member is prevented. In operation, the rockable member and bushing oscillate about the axis of the transverse pivot pin thereby limiting the wear to the replaceable and relatively inexpensive pin and bushing components.

It is a principal object of the present invention to provide a spring-loaded tool clamp wherein the pivot connection between the tool shank and the tool frame includes replaceable pin and bushing components.

It is a further object of the present invention to provide a spring-loaded clamping arrangement for a tool shank of the type outlined in the previous paragraph wherein the bushing is held against rotation relative to the rockable member in which it is installed.

It is a further object of the present invention to provide a spring-loaded tool clamp wherein a spring rod extends through a coil compression spring and carries a plastic sleeve for maintaining the spring coils in relatively good alignment.

BRIEF DESCRIPTION OF THE DRAWINGS

One embodiment of the present invention is illustrated in the drawings in which:

FIG. 2 is a end view taken along the line II—II in FIG. 1;

FIG. 3 is a section view taken along the line III—III in FIG. 1;

FIG. 4 and FIG. 5 are section views taken along the lines IV—IV and V—V, respectively, in FIG. 1; and FIG. 6 is a section view taken along the line VI—VI in FIG. 5.

DETAILED DESCRIPTION OF THE DRAWINGS

Figure 1:
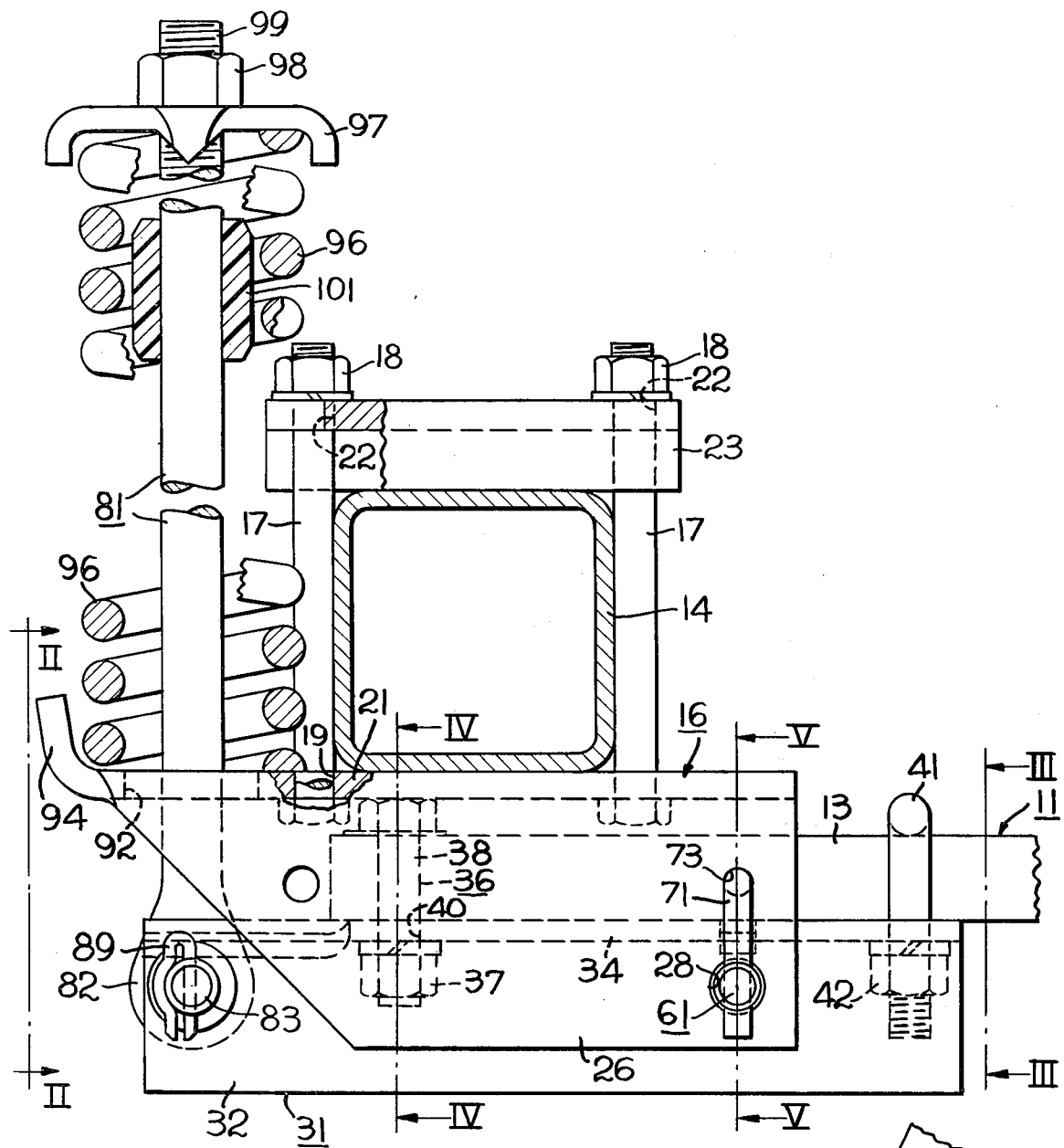
FIG. 1 is a side view of the spring-loaded tool clamp of the present invention with tool parts broken away for illustration purposes.
Figure 1:
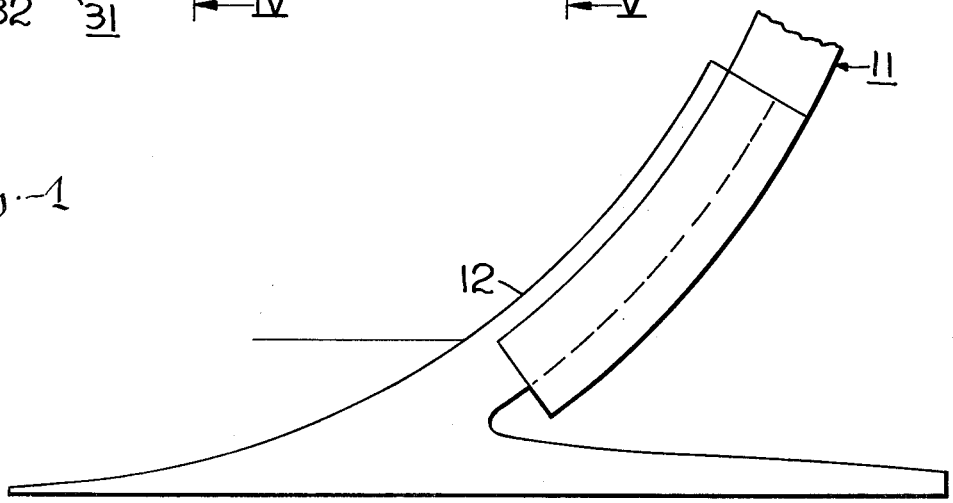

Referring to FIG. 1, a chisel plow shank 11 is shown in its normal operating position. An earth-working tool 12 is releasably secured to the lower end of the shank 11 by releasable fastening means not shown. The shank 11 curves in substantially a C-shape with the upper end 13 being horizontally disposed below a transversely extending frame in the form of a tool bar 14. A clamping member 16 is rigidly secured to the transverse tool bar 14 by four upright bolts 17 and four nuts 18. The bolts 17 extend through bores 19 in the horizontal wall 21 of the clamping member 16 and through bores 22 in an upper clamping plate 23. The clamping member 16 includes downwardly extending walls or flanges 26, 27 having aligned transverse bores 28, 29. A rockable member in the form of a channel 31 is disposed between the walls 26, 27 of the clamping member 16 and has downwardly extending walls or flanges 32, 33 and a horizontal web or upper wall 34, the latter being disposed below the horizontal portion 13 of the shank 11. As shown in FIGS. 2, 3, 4 and 5, the walls 26, 27 are in juxtaposed relation to the walls 32, 33, respectively. The front end of the horizontal portion 13 is releasably secured to the rockable member 31 by a bolt 36 and a nut 37. The shank 38 of the bolt 36 extends through aligned vertical openings 39, 40 in the shank portion 13 and rockable member 31, respectively, and the head of the bolt 36 is in abutment with the underside of the top wall 21 of the clamping member 16. The rear end of the rockable member 31 is secured to the shank portion 13 by a U-bolt 41 and nuts 42.

Referring also to FIGS. 5 and 6, a pivot component in the form of a split bushing 46 is mounted at its opposite ends in aligned transverse bores 47, 48 in the downardly extending flanges 32, 33 of the rockable member 31. The bushing includes circumferentially facing surfaces 51, 52 which define a circumferential gap or recess into which abutments in the form of downwardly bent tabs 53, 54 extend from wall 34 to prevent the bushing 46 from rotating relative to the rockable member 31. The tabs 53, 54 present fore and aft facing surfaces in confronting, abuttable relation to the surfaces 51, 52 of the bushing. A pivot component in the form of a pin 61 extends through the aligned bores 28, 29 in the clamping member 16 and through the bushing 46. The outer cylindrical surface 66 of the pin 61 is in bearing engagement with the inner cylindrical surface 67 of the bushing 46. The pin 61 is locked against rotation by locking means in the form of an L-shaped locking pin 71 whose opposite ends extend into openings 72 and 73 in the pin 61 and the clamping member 16. A nut 74 is threaded onto the threaded portion 76 of the pin 61 thereby maintaining the pin 61 in assembly with the clamping member 16.

An upright tension member or rod 81 has an eye portion 82 at its lower end which is pivotally connected to the front end of the rockable member 31, which extends forwardly beyond the shank portion 13, by a replaceable pin 83 extending through aligned bores 84, 85 in the walls 32, 33. The pin 83 is held in assembly with the rockable member 31 by a releasable snap pins 88, 89. The rod 81 extends upwardly through a large opening 92 in the front end of the clamping member 16 which extends beyond the frame or tool bar 14. The extreme front end 94 of the clamping member 16 is bent upwardly to help maintain the lower end of a coil compression spring 96 in proper position relative to the rod 81 and opening 92. The upper end of the rod 81 is connected to the upper end of the spring 96 by a washer 97 and nut 98 threadedly engaging the upper threaded end 99 of the rod 81. A plastic sleeve 101, which is press fit on the rod 81, serves to maintain the coils of the spring 96 in substantial alignment during operation of the chisel plow.

During an earth-working operation, a generally upward and rearward force is exerted by the bushing 46 against the pin 61. By placing the split portion of the bushing 46 above the pin 61 an adequate area of the bearing surface 67 of the bushing 46 is available for load carrying engagement with the bearing surface 66 of the pin 61. The locking pin 71 and the abutting contact between the bushing and clamping member prevent any rotation of the pin and bushing components relative to the members in which they are secured. Thus as the tool skank pivots against the biasing force of the compression spring 96, all wear at the pivot connection occurs at the bearing surfaces 66, 67 of the pin and bushing. If the pin 61 and/or bushing 46 become excessively worn, replacement thereof is easily accomplished at very low cost. The large bearing area afforded by the bearing surfaces 66, 67 contributes to a long life pivot connection as compared to prior art pivot connections for tool shanks in which pin and bushing connections are not used.

The embodiments of the invention in which an exclusive property or privilege is claimed are defined as follows:

1. In a spring-loaded clamp for the shank of an earth-working tool, the combination comprising:
    a clamping member adapted for attachment to a frame including a pair of laterally spaced downwardly extending walls presenting aligned transverse openings,
    a tool shank having
        a horizontally extending portion at its upper end,
        a rockable member rigidly secured to said horizontally extending portion having laterally spaced vertically extending flanges disposed between and in juxtaposed relation to said walls, and aligned transverse bores in said flanges,
    a pivot bushing having opposite ends in said bores of said flanges and presenting a radially inward facing cylindrical bearing surface, said opposite ends of said bushing being in axially confronting relation to the laterally inner sides of said walls, and said bushing being nonrotatable relative to said flanges,
    a pivot pin extending through said bushing and having opposite ends disposed in said aligned openings in said walls, said pin being nonrotatable relative to said walls and presenting a radially outward facing cylindrical bearing surface in radial load bearing engagement with said bearing surface on said bushing, and
    spring means operatively interposed between said shank and said clamping member resiliently urging said shank in one direction to a predetermined operating position.

2. The combination of claim 1 and further comprising locking means operatively associated with said bushing and rockable member operative to prevent rotation of said bushing in said bores.

3. The combination of claim 1 wherein said bushing includes wall means with surfaces defining an axially extending recess in said bushing and wherein said rockable member includes a downwardly extending part extending into said recess, said part and said surfaces cooperating to prevent rotation of said bushing in said bores.

4. The combination of claim 1 wherein said bushing is axially split with circumferentially spaced confronting end surfaces and wherein said rockable member has an abutment part extending into the space between said end surfaces whereby said bushing is prevented from rotating in said bores.

5. The combination of claim 4 wherein said abutment part is a tab bent downwardly from the web portion of said rockable member.

6. The combination of claim 1 wherein said spring means includes an upright compression coil spring having a lower end abutting the top side of the front of said clamping member and a tension member interconnected between the top of said spring and said horizontal portion of said shank.

7. The combination of claim 6 wherein the forward end of said rockable member extends beyond the forward end of said horizontally extending portion of said shank and said tension member is connected to said forward end of said rockable member.

8. The combination of claim 7 wherein said tension member extends axially through said coil spring and further comprising a plastic sleeve on the part of said tension member within said coil spring.

9. The combination of claim 1 wherein said rockable member includes a web disposed beneath said horizontally extending portion of said shank and said flanges extend downwardly from said web.

10. The combination of claim 9 wherein said web and horizontally disposed portion of said shank include aligned vertical openings and further comprising a bolt having a shank extending downwardly through said vertical openings with a head on the upper end thereof and a nut on said bolt in thrust transmitting engagement with the underside of said web, the head of said bolt engaging said pivot bracket to limit pivotal movement of said shank about said pivot pin in said one direction.

11. The combination of claim 1 and further comprising locking means operatively associated with said pivot pin and clamping member to prevent relative rotation thereof.

12. The combination of claim 1 wherein said rocking member and bushing have cooperating abutment surfaces preventing rotation of said bushing relative to said rockable member.

13. In a spring-loaded clamp for the shank of an earth-working tool having a frame, the combination comprising:
    a clamping member releasably secured to said frame including a pair of laterally spaced vertical walls having aligned openings,
    a rockable member releasably secured to the upper end of said shank including a pair of laterally spaced vertical walls which are in side-by-side relation with said vertical walls on said clamping member and present aligned openings,
    a bushing having opposite ends in the aligned openings of only one of said members, said ends of said bushing being in axially confronting relation to said walls of said other member, and said bushing being nonrotatable relative to said one member,
    a pin extending through said bushing and having its opposite ends in the aligned openings of the other of said members, said pin being nonrotatable relative to said other member, and spring means operatively interposed between said clamping and rockable members biasing said shank toward an earth-working position.

14. The clamp of claim 13 wherein said clamping member includes a horizontal wall and said vertical walls of said clamping member extend downwardly from said horizontal wall.

15. The clamp of claim 14 wherein said one member is said rockable member, said rockable member includes a horizontal part, said vertical walls of said rockable member extend downwardly from said horizontal part, and said rockable member is disposed between said vertical walls of said clamping part.

16. The clamp of claim 15 wherein said upper end of said shank is disposed above and secured to said horizontal part of said rockable member.

17. The clamp of claim 13 wherein cooperative abutment surfaces are presented by said bushing and said one member which cooperate to prevent rotation of said bushing relative to said one member.

18. The clamp of claim 17 wherein said abutment surfaces include a tab and a recess.

19. The clamp of claim 18 wherein said bushing is split to present said recess.

* * * * *